Figure 8:
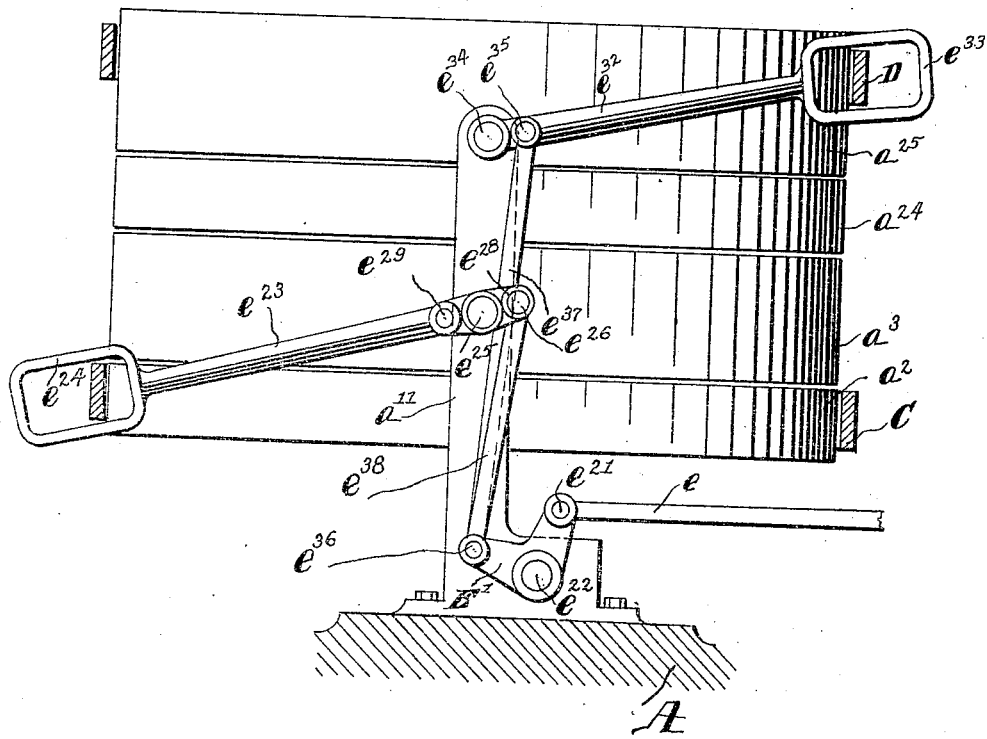

H. W. HUNT.
POWER TRANSMITTING DEVICE.
APPLICATION FILED AUG. 15, 1908.
962,842.
Patented June 28, 1910.
5 SHEETS—SHEET 1.
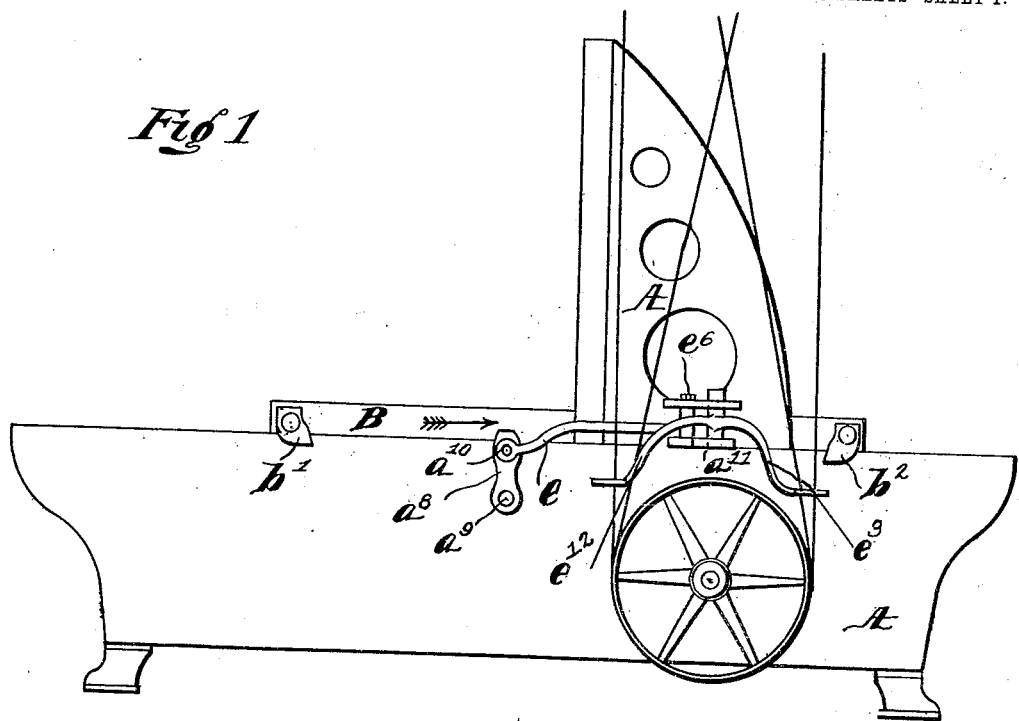
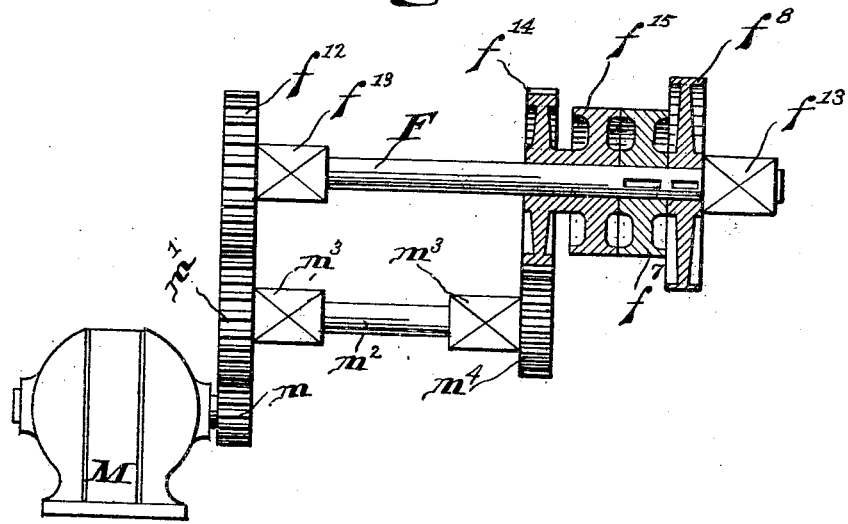

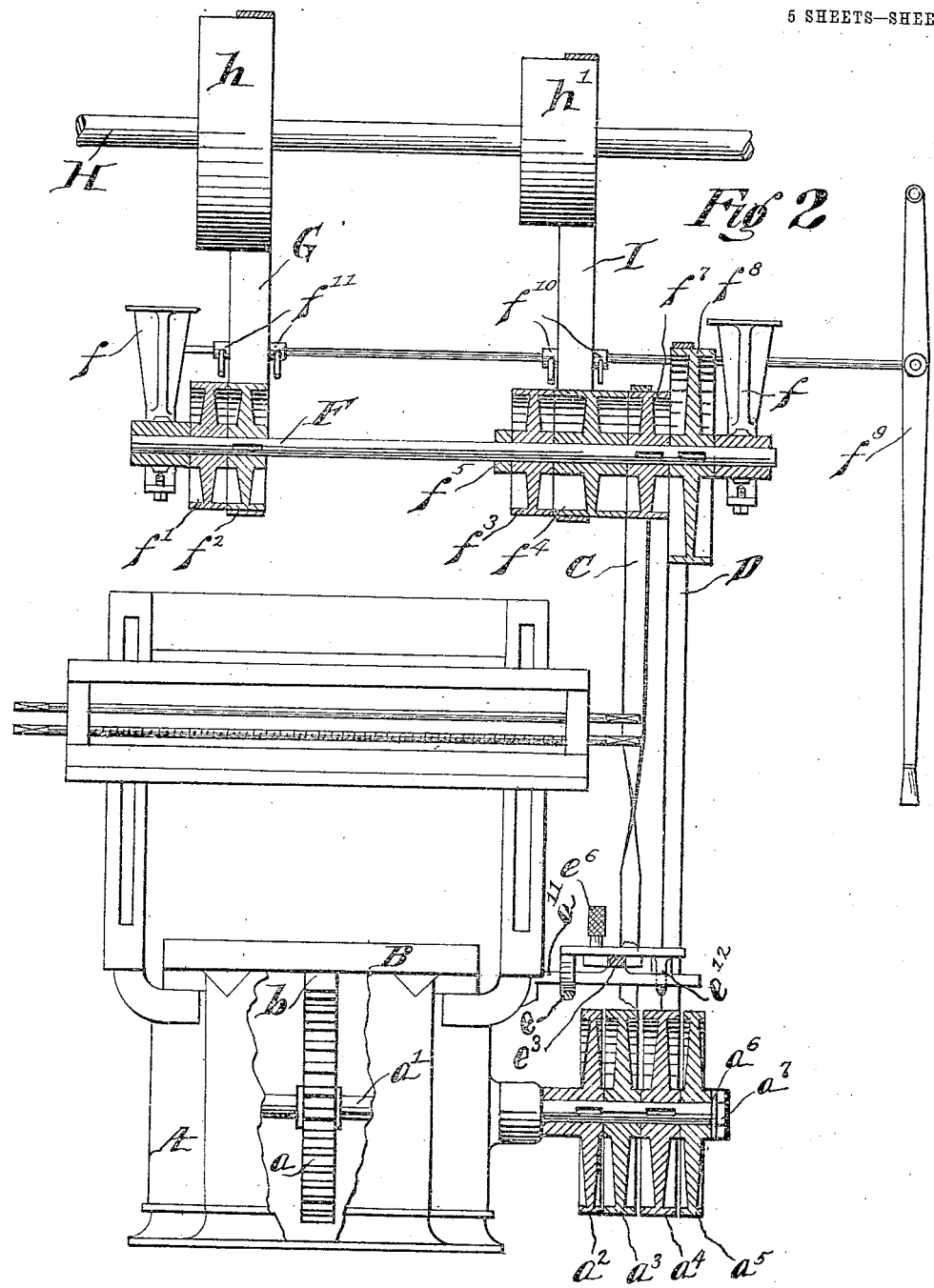

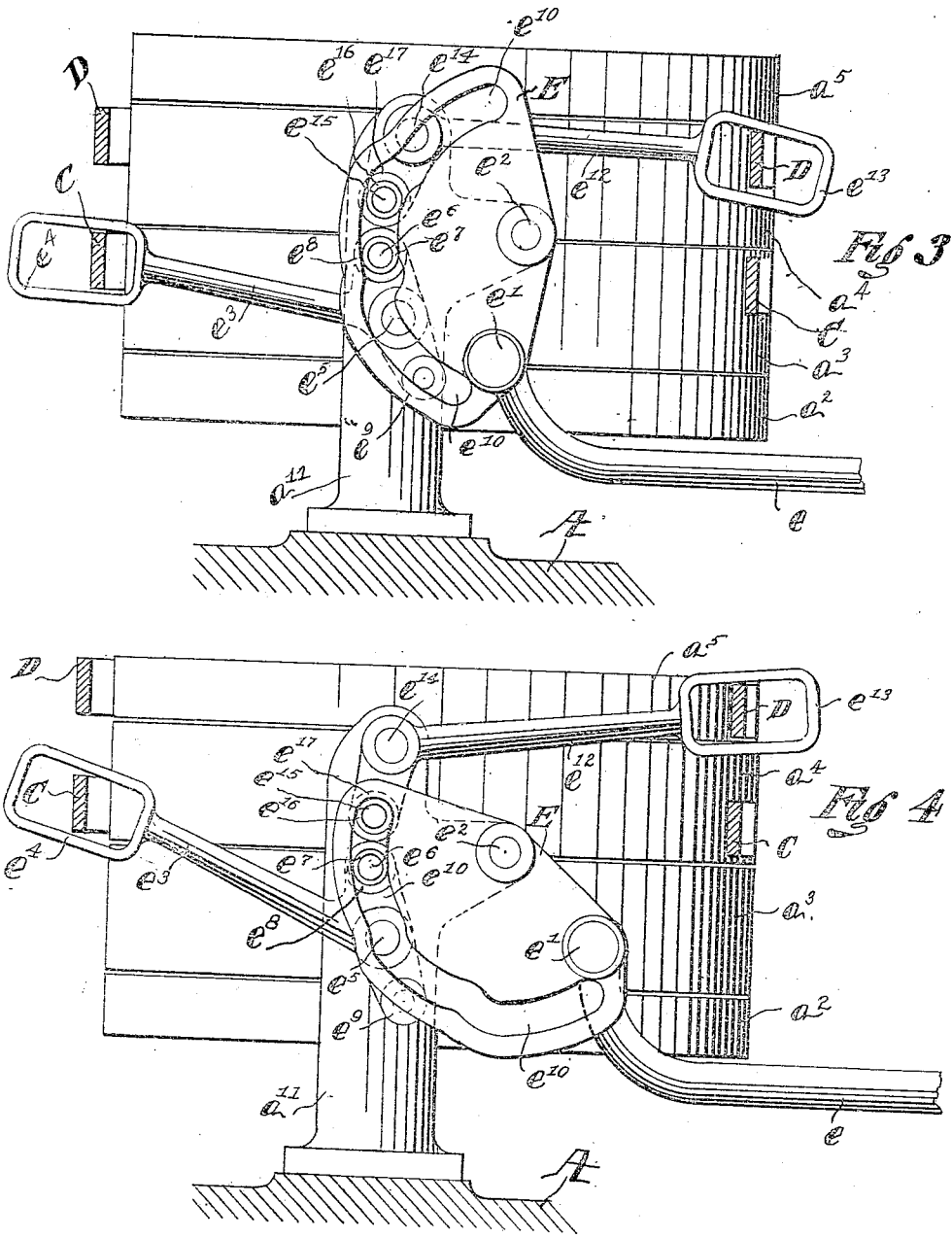

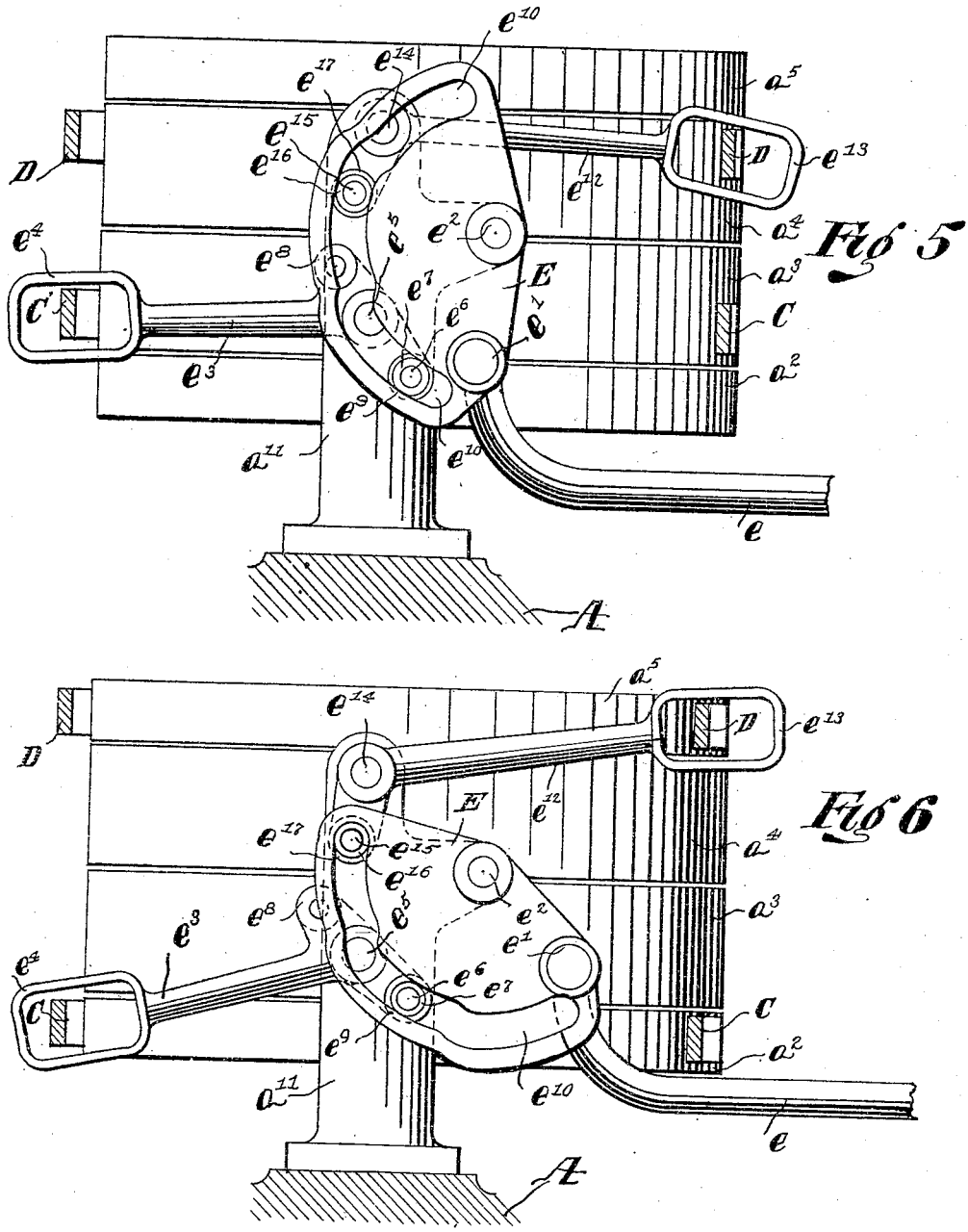

H. W. HUNT.
POWER TRANSMITTING DEVICE.
APPLICATION FILED AUG. 15, 1908.

962,842.

Patented June 28, 1910.
5 SHEETS—SHEET 5.

Witnesses
Carroll H. Richards
Joseph P. Gardner

Inventor
Howard Wilson Hunt
by Walter A. Knight
Attorney

UNITED STATES PATENT OFFICE.

HOWARD WILSON HUNT, OF PLEASANT RIDGE, OHIO.

POWER-TRANSMITTING DEVICE.

962,842.     Specification of Letters Patent.     Patented June 28, 1910.

Application filed August 15, 1908. Serial No. 448,700.

*To all whom it may concern:*

Be it known that I, HOWARD WILSON HUNT, a citizen of the United States, residing at Pleasant Ridge, in the county of Hamilton and State of Ohio, have invented new and useful Improvements in Power-Transmitting Devices, of which the following is a specification.

My invention relates to new and useful improvements in power transmitting devices for reciprocating mechanisms and particularly for machine tools, such as planers and shapers.

Some materials can be cut rapidly, others must be cut slowly, therefore it is desirable to provide more than one speed for such machine tools; and as no work is done on the return stroke in any case, it is desirable to always return at the same and a higher speed.

My invention provides simple and inexpensive mechanism to secure either of two speeds on the cutting stroke and a higher and constant speed on the return stroke; and consists of novel adjustable means on the machine, for maintaining the selected cutting speed and a novel counter-shaft mechanism permitting the change of cutting speeds without affecting the return speed.

Attention is called to the fact that but two belts from counter-shaft to machine, two belt shifters and one cam or its equivalent are used, as in ordinary machines having one cutting speed only, and that no speed boxes or other similar devices composed of complicated trains of gears are used.

No friction clutches are used and the action is positive throughout.

In the particular embodiment of my invention selected for illustration:—Figure 1, is a side elevation of a metal planer, equipped with my improved power transmitting mechanism. Fig. 2, is an end elevation of the same, its counter and line shaft and connections, with pulleys shown in section and link and guide arm broken and in section. Fig. 3, an enlarged detail, is a top plan view of the adjustable belt-shifting mechanism on the machine, set for high cutting speed with belts in position for return stroke. Fig. 4, an enlarged detail, is the same as Fig. 3, with belts in position for cutting stroke. Fig. 5, an enlarged detail, is the same as Fig. 3, only set at low cutting speed with belts in position for return stroke. Fig. 6, is an enlarged detail, the same as Fig. 5, with belts in position for cutting stroke. Fig. 7, a modification, is a counter-shaft and its direct connected motor, for use where the planer is to have an individual motor. Fig. 8, a modification of the shifter mechanisms attached to the machine, shows a system of belt shifting levers with operating links directly connected instead of the cams.

Referrring to the drawings, A, is the frame, and B, the work table slidably mounted theron in the usual manner, and it is the purpose of this invention to impart to the reciprocating table either of two speeds when moving in the direction of the arrow, and a single speed when traveling in the opposite direction. A gear rack, $b$, is fixed to the under side of the table, B, A gear, $a$, fixed to the shaft, $a^1$, journaled in the frame, A, meshes with the rack, $b$, and imparts longitudinal motion to the table. The shaft, $a^1$, or another connected thereto by gearing is projected outwardly on one side, and carries pulleys, $a^2$, $a^3$, $a^4$, $a^5$, of equal diameter. Of these, $a^2$, and $a^4$, are fixedly attached to the shaft, and $a^3$, and $a^5$, are loose thereon; and $a^2$ and $a^5$, are of the width of their belts, C, and D, respectively while, $a^3$, and $a^4$, are of double their belt widths. A washer, $a^6$, and nut, $a^7$, hold the pulleys on the shaft.

The table, B, carries two tripping dogs, $b^1$, $b^2$, adapted to engage and oscillate lever, $a^8$, pivoted to the frame of the planer at, $a^9$. To the lever, $a^8$, at, $a^{10}$, is pivoted a link, $e$, which link is pivoted at, $e^1$, to the cam, E. The cam, E, is pivoted at, $e^2$, to an extension, $a^{11}$, of the frame, A, and is oscillated upon its pivot-pin by a movement of the lever, $a^8$, through the link, $e$, and has an approximately concentric slot, $e^{10}$, with suitable eccentric surfaces as shown. Also to the extension $a^{11}$, and in a plane beneath the cam plate, E, are pivoted two belt-shifting arms, $e^3$ and $e^{12}$, each provided at its outer extremity with a belt-yoke, $e^4$ and $e^{13}$, respectively.

The arm $e^3$ at its inner extremity has a T-head, $e^{10}$, set at an angle to the arm proper. The pivotal connection of the arm with the extension $a^{11}$ is by a stud, $e^5$, and the outer extremities of the T-head (as at $e^8$ and $e^9$) are pierced and threaded to receive interchangeably a removable stud, $e^6$, provided with a loose friction collar, $e^7$.

The arm $e^{12}$, pivoted to the extension $a^{11}$ upon a stud, $e^{14}$ has an L-head with a fixed stud, $e^{15}$, projecting laterally at its outer end provided with a friction collar, $e^{16}$.

The studs, $e^6$ and $e^{15}$, carrying each its friction collar, project through and engage in a curved slot, $e^{10}$, of the cam plate, E, and, by the oscillation of the latter impart a pendulous movement to the belt-shifting arms, $e^3$ and $e^{12}$, which by means of their terminal yokes, $e^4$ and $e^{13}$, control the belts C and D as will be more clearly apparent from Figs. 3 and 4 (Sheet 3) and Figs. 5 and 6 (Sheet 4). In Figs. 3 and 4 the shifting arm, $e^3$, shifts belt C between pulleys $a^3$ and $a^4$.

In Figs. 5 and 6, the stud, $e^6$ with its friction ring, $e^7$, are shown removed to the opposite extremity of the T-head, $e^{10}$, and the yoke, $e^4$, now shifts the belt C between pulleys $a^2$ and $a^3$. The two former figures show the relative position of the parts at the high cutting speed and the two latter at the low cutting speed.

A suitably placed counter shaft, F, supported by hangers, $f$, is provided with a pair of pulleys, $f^1$, (a loose pulley), and, $f^2$, (a tight pulley), connected by belt, G, with the pulley, $h$, fixedly attached to the line shaft, H. This line shaft has a smaller pulley, $h^1$, fixed thereto and is connected to a pair of loose pulleys, $f^3$, $f^4$, on the shaft, F, by a belt, I. A collar, $f^5$, holds the pulley, $f^3$, in position. The pulley, $f^4$, is adapted to carry the belt, I, on the portion next the pulley, $f^3$, and at the same time to carry the belt, C, on the other portion of its face in either of two positions. Pulley, $f^7$, of the same diameter as, $f^3$, and, $f^4$, is fixedly attached to the shaft, F, and its face is double the width of its belt, C. A larger pulley, $f^8$, also fixed to the shaft, F, has its face double the width of its belt, D. A shifter, $f^9$, through guides, $f^{10}$, $f^{11}$, is adapted to control the belts, G, and I, and throw the machine into and out of operation. On slow cutting speed the removable stud, $e^6$, is on the inner side of the fulcrum-pivot, $e^5$, while on high speed this stud is on the outside of the fulcrum-pivot, hence the same cam track gives an opposite movement with the effect before described and shown in the drawings.

The operation is as follows:—When the machine is to be operated the shifter will be set as shown in Fig. 2, and through belt, G, and pulley, $f^2$, the shaft, F, will be put in constant rotation. The double pulley, $f^4$, then will be constantly rotated by the belt, I. The cam stud, $e^6$, then will be placed, if high speed is desired, in the position shown in Figs. 2, 3 and 4, with the result that the belt, C, will run exclusively on the pulley, $f^7$, above, and below on the inside of $a^4$, when driving and the outside of $a^3$, when the table is returning. It is apparent that the power transmitted from the large pulley, $h$, to the small pulley, $f^2$, transmits a speed which is accelerated through the shaft, F, pulley, $f^7$, and pulley, $a^4$, and its connections to the table. If lower speed is desired, place the stud, $e^6$, in the position shown in Figs. 5 and 6, and the belt, C, will run exclusively on the portion of the pulley, $f^4$, toward the pulley, $f^7$, above, and below on the pulley, $a^2$, and the inside of the face pulley, $a^3$. This allows the power transmitted from the small pulley, $h^1$, to the pulley, $f^4$, at a lower speed than from, $h$, to $f^2$, to be transmitted from, $f^4$, through, $a^2$ and its connections to the table. Thus it will be seen that the speed at which the table travels on the stroke is entirely dependent upon the position of the belt, C, which is controlled in the device just described by the position of the removable cam stud, $e^6$. This is equally true where the counter shaft shown in Fig. 7, is used, the motor, M, through gear, $m$, rigid on the driving shaft, transmits power to gear, $m^1$, fixed to shaft, $m^2$, journaled at, $m^3$, $m^3$. Gear, $m^1$, transmits power to gear, $f^{12}$, fixed to the shaft, F, which is journaled at, $f^{13}$, $f^{13}$. Gear, $m^4$, transmits power to gear, $f^{14}$, loose on shaft, F, but integral with pulley, $f^{15}$, also loose on shaft. Pulleys, $f^{15}$, and, $f^7$, of same diameter, and the latter fixed to shaft, F, are of double belt width. Combined gear and pulley, $f^{14}$, $f^{15}$, is the equivalent of pulley, $f^4$. This being kept in mind no further description of operation of the planer described when provided with a direct connected motor is necessary.

In the modification shown in Fig. 8, the link, $e$, is pivoted at, $e^{21}$, to a bell-crank, $E^1$, which in turn is pivoted to the projection of the frame, $a^{11}$, at, $e^{22}$. Pin, $e^{36}$, connects the bell-crank, $E^1$, with links, $e^{37}$, and, $e^{38}$. Link, $e^{37}$, is permanently connected with return belt shifter, $e^{32}$, by the pin, $e^{35}$. Link, $e^{38}$, is adjustably connected with the belt shifter by placing the removable pin, $e^{26}$ in the hole, $e^{28}$, for slow speed, or the hole, $e^{29}$, for high speed.

Attention is called to the fact that in this modification the tight pulley, $a^{24}$, is of single belt width, while the loose pulley $a^{25}$, is of double belt width, while the reverse is true of the type shown in the other drawings. This change of pulley widths will necessitate a change on the counter shaft, making pulley, $f^8$, three belt widths.

The operation of the modification will be apparent.

I apprehend that many changes can be made in the mechanism without departing from the spirit of my invention and therefore I do not limit myself to the mechanisms shown.

I claim as my invention and desire to secure by Letters Patent of the United States:—

1. In a planer, the combination of a reciprocatory platen, devices adjustable to positions for imparting a forward movement at different speeds and a constant-speed backward movement thereto; a pivoted cam connected to control the action of both of said devices,—the forward movement connection being adjustable relatively to said cam to produce either of the speeds provided for; mechanism operated by the platen to oscillate said cam and means operated by the cam to throw the forward and backward movement devices into and out of driving connection alternately.

2. In a planer, the combination of a reciprocatory platen and a power transmitting mechanism embodying two tight and two loose pulleys upon the platen-operating shaft, two belts operating upon said pulleys to produce forward and backward movements of the platen, a guide mover actuated by the platen, belt guides operatively connected with said guide-mover, one of said guides being adapted to shift its belt alternately to a tight pulley and an adjacent loose pulley, and the other guide being adjustable in relation to the guide-mover and adapted when in one adjusted position to shift its belt alternately to a tight pulley and an adjacent loose pulley, and when in its other adjusted position to shift its belt to the same loose pulley and a different tight pulley.

3. The combination of a main shaft, two double-width fast pulleys of different diameters thereon; an intermediate or counter shaft; a fast and a loose pulley thereon and a shiftable belt connecting the same with the larger pulley of the main shaft; a single-width pulley and a double-width pulley, both loose, also on said counter-shaft, a shiftable belt connecting the same with the smaller pulley of the main shaft; and two tight double-width transmitting pulleys of different diameters on said countershaft; a machine shaft; a single-width tight pulley and an adjacent double-width loose pulley thereon; a shiftable belt connecting said pulleys with the smaller transmitting pulley and the double-width loose pulley of the countershaft; a second tight pulley (but of double-width) and a second loose pulley (but of single width) upon said machine shaft and a shiftable belt connecting the said pulleys with the larger transmitting pulley of the counter shaft.

4. The combination of a countershaft, a tight and a loose pulley thereon, means for driving the countershaft at a predetermined speed, means for driving the loose pulley at a speed different from that of the countershaft, a driven shaft, a pulley thereon, a belt engaging with said pulley and with the tight pulley, and means for shifting said belt onto the loose pulley.

In testimony whereof I have hereunto set my hand in presence of two subscribing witnesses.

HOWARD WILSON HUNT.

Witnesses:
   JOSEPH R. GARDNER,
   CARROLL H. RICHARDS.